United States Patent
Williams et al.

(10) Patent No.: US 7,756,837 B2
(45) Date of Patent: Jul. 13, 2010

(54) METHODS AND APPARATUS FOR SEARCHING BACKUP DATA BASED ON CONTENT AND ATTRIBUTES

(75) Inventors: Tim Williams, Rumson, NJ (US); Gordon Harris, Warren, NJ (US)

(73) Assignee: Index Engines, Inc., Rumson, NJ (US)

( * ) Notice: Subject to any disclaimer, the term of this patent is extended or adjusted under 35 U.S.C. 154(b) by 943 days.

(21) Appl. No.: 11/010,497

(22) Filed: Dec. 13, 2004

(65) Prior Publication Data

US 2005/0166082 A1 Jul. 28, 2005

Related U.S. Application Data

(60) Provisional application No. 60/535,732, filed on Jan. 9, 2004.

(51) Int. Cl.
*G06F 7/00* (2006.01)
*G06F 17/00* (2006.01)

(52) U.S. Cl. ............................ 707/670; 711/161
(58) Field of Classification Search .......... 707/200, 707/202, 204, 205, 640, 641, 642, 654, 661, 707/665, 667, 668, 670; 711/100, 111, 161, 711/162; 714/1, 2, 6
See application file for complete search history.

(56) References Cited

U.S. PATENT DOCUMENTS

| | | | | |
|---|---|---|---|---|
| 5,758,360 | A * | 5/1998 | Zbikowski et al. .......... 707/205 |
| 6,549,992 | B1 * | 4/2003 | Armangau et al. .......... 711/162 |
| 6,571,257 | B1 | 5/2003 | Duggan et al. | |
| 6,813,624 | B1 * | 11/2004 | Dharanipragada et al. .. 707/204 |
| 6,959,368 | B1 * | 10/2005 | St. Pierre et al. ............ 711/162 |
| 7,036,041 | B2 * | 4/2006 | Akamatu et al. .............. 714/6 |
| 7,080,105 | B2 * | 7/2006 | Nakanishi et al. ........... 707/204 |
| 2003/0105746 | A1 | 6/2003 | Stickler | |
| 2003/0154220 | A1 | 8/2003 | Cannon | |
| 2003/0182330 | A1 * | 9/2003 | Manley et al. .............. 707/205 |
| 2003/0217033 | A1 | 11/2003 | Sandler | |

(Continued)

FOREIGN PATENT DOCUMENTS

WO 0225462 A 3/2002

(Continued)

OTHER PUBLICATIONS

International Search Report and Written Opinion for corresponding PCT application PCT/US04/41890.

(Continued)

*Primary Examiner*—Greta L Robinson
(74) *Attorney, Agent, or Firm*—Matthew B. Dernier, Esq.; Gibson & Dernier LLP

(57) ABSTRACT

Methods and apparatus are disclosed that permit the transparent bridging of a broad range of backup storage devices, such that backup software will identify an intermediate device as a one of those storage devices and will transparently send their backup data-stream thereto as part of the existing standard backup process. Upon receipt of a backup data-stream from the backup software, the methods and apparatus provide for analysis of the data elements in the data-stream, collection of management information about those data elements, and storage of the management information in an easily accessible format for subsequent review and query by users and administrators of the original data. The same backup data-stream is stored on any standard backup storage device, including the imitated backup storage device.

49 Claims, 5 Drawing Sheets

U.S. PATENT DOCUMENTS

| | | | |
|---|---|---|---|
| 2004/0236800 A1* | 11/2004 | Elkady et al. | 707/204 |
| 2005/0108486 A1 | 5/2005 | Sandorfi | |
| 2005/0149584 A1* | 7/2005 | Bourbonnais et al. | 707/204 |
| 2005/0203976 A1 | 9/2005 | Hyun et al. | |
| 2009/0182789 A1* | 7/2009 | Sandorfi et al. | 707/204 |

OTHER PUBLICATIONS

Supplemental Search Report for corresponding European patent application EP 04 81 4114.

European Office Action for corresponding EP application 04814114.7-2224 Dated: Mar. 11, 2009.

* cited by examiner

METHODS AND APPARATUS FOR SEARCHING BACKUP DATA BASED ON CONTENT AND ATTRIBUTES

CROSS REFERENCE TO RELATED APPLICATIONS

This application is based on and claims the benefit of U.S. Provisional Patent Application No. 60/535,732, filed Jan. 9, 2004, the entire disclosure of which is hereby incorporated by reference.

BACKGROUND OF THE INVENTION

The present invention relates to methods and apparatus for providing backup storage in which the backup data are indexed as an integral part of the backup storage process.

Backup is the process where data stored on the digital media of a computer system is copied to a reliable non-volatile storage medium. The traditional non-volatile storage medium in use today is some form of a tape subsystem, although there is a growing trend to store data on specially built disk subsystems (so-called "virtual tape drives"). If needed, data from the reliable non-volatile storage can be restored at a later date. This would typically be done to recover from a loss of, or corruption to, the original digital data or storage media. Another context in which backup storage is employed is to recover a copy of an old file, folder, etc. that was deleted, modified, or replaced—either accidentally or intentionally. In an ideal world, backup would not be needed.

Throughout the years, although the primary purpose for data backup has not changed, the technology involved with the backup process has evolved. Such evolutionary changes include faster tape drives, disks, and interconnect technologies, which have allowed more data to be backed up and restored in less time. Another significant technology change in recent years is the advent of faster networks like a Storage Area Network (SAN), which allows a single backup device to be shared amongst many users and/or source hosts. The employment of faster shared networks have significantly reduced administrative expenses. The software responsible for backing up data has also evolved. The latest software supports shared devices, allows administrators to better track the success of backups, and allows a user to restore a much finer granularity of backed up data (e.g., individual files).

What has not changed in connection with the data backup process is the fact that, overwhelmingly, data backup is a costly and onerous process used to protect data against worst-case scenarios that, in practice, rarely if ever happen. Backup only adds value to an enterprise if the data that is preserved is subsequently restored after a digital media failure. So excluding such disaster recovery situations, the return on investment for the data backup process is essentially zero.

The exponential growth of data storage throughout most enterprises has created many challenges for storage administrators. In addition to the important backup and restoration process as described above, administrators must fulfill many requests from their users. Users constantly demand new storage and often loose track of what they have stored. About ten years ago these types of problems started to be addressed in a class of products collectively referred to as the Storage Resource Management (SRM) market. Today, a whole industry of SRM companies exists to assist the storage administrator with the management of their storage. SRM is a distinct administrative step (separate from the traditional data backup process) requiring trained individuals to install and setup a complex infrastructure.

An SRM product is basically a software program residing on a central server connected to a network of many user desktop computers and the like. The SRM software employs software "agents" that travel throughout the network to scan each data repository of files, collect data, and report back to the central server. The data typically collected by the agents include the host, size, type, owner, and access time of, for example, individual files stored on the user's computers. The SRM product organizes the collected data so that the storage administrator can track growth trends, usage patterns, detect wasted space, etc.

Among the disadvantages of traditional SRM is that it does not index the document, e.g., to generate searchable keywords for the text of the document. All SRM does is compile meta-data, information about the document like the name, the author, the program that created it, etc. Thus, the value of SRM is very limited. Another disadvantage of traditional SRM is that the meta-data collection is a distinct administrative process that scans the storage media of the network. The process of scanning a data repository is very time consuming and often competes with many other "overnight processes" that need to be run, including data backup. Indeed, because both the traditional data backup process and the traditional SRM processes are distinct administrative functions, they often conflict with one another as to the time available for administrative functions. This problem is exacerbated because, with the ever-increasing need to make data available globally, the concept of an "overnight process" is losing its distinction. Thus, the available time for administrative functions is shrinking.

It is generally acknowledged that existing methods for obtaining the information generated by SRM products is often very intrusive to computing devices, and often significantly degrades the reliability of those devices. This makes the implementation of an SRM product undesirable in the very environment where it could otherwise add value. This has and will continue to prevent the widespread adoption of SRM products.

Accordingly, there are needs in the art for new methods and apparatus for providing both data backup and detailed and available information concerning the data itself that do not overly tax the available time for overhead and administrative functions in a computing environment.

SUMMARY OF THE INVENTION

In view of the limitations now present in the prior art, the present invention is directed to new methods and apparatus for providing both data backup and other information. One or more aspects of the present invention provide new and useful value to the standard backup processes by transparently creating detailed information concerning the backup data as a transparent part of the backup process. Advantageously, this eliminates the need, cost and overhead of an administrative process (distinct from the backup process itself) to create such information. Various aspects of the methods of the instant invention are simpler in construction, more universally usable and more versatile in operation than known methods or processes. In addition, the various features of the instant invention result in new, previously unavailable levels of information about data in a computing environment.

In accordance with one or more aspects of the present invention, a method includes: receiving at least one data-stream intended for archiving on a backup storage device;

extracting management data from the data-stream, the management data being descriptive of the data of the data-stream; and storing the management data in a searchable format in a database. This may include one or more of: (i) passing the data-stream to the backup storage device before the extraction step; (ii) passing the data-stream to the backup storage device substantially simultaneously with the extraction step; and (iii) passing the data-stream to the backup storage device after the extraction step. Thus, the method may involve reading back data from the backup storage device after the data-stream has been passed to the backup storage device to re-create the data-stream, and performing the extraction step on the re-created data-stream.

The management data may include at least one of: (i) an identifier of a source of the data-stream; (ii) volume information concerning where the data of the data-stream were stored; (iii) metadata of the data of the data-stream; (iv) information concerning types of data files of the data-stream; (v) keywords of the data files of the data-stream. For example, the volume information may include at least one of: (i) a size of each volume of data, (ii) space consumed by each volume, and (iii) space available in each volume. The metadata may include at least one of: (i) one or more identifiers of one or more groups of users generating the data, (ii) one or more identifiers of one or more users generating the data, (iii) file and/or folder sizes of the data, and (iv) one or more identifiers of one or more authors generating the data.

The extraction step may include at least one of: (i) separating distinct data sets from the data-stream; and (ii) segregating types of data within the data sets into data groups. For example, the distinct data sets may include at least one of file folders, data files, and types of data files. The types of data may include at least one of: text data, image data, audio data, graphic data, tabular data, hyperlink data, and executable data. The method preferably further includes indexing at least one of the types of data to obtain keywords thereof. The method may further comprise using a predetermined rule set to recognize the distinct data sets of the data-stream. The predetermined rule set may be based on a data-stream protocol of a third party backup data product intended to be used to store the data-stream on the backup storage device. For example, the predetermined rule set may be taken from a group of pre-determined rule sets, each set based on a data-stream protocol of a third party backup data product.

The method preferably further includes: receiving at least one query from a party concerning the archived data-stream; formulating one or more responses to the query based on an analysis of the management data stored in the database; and providing the one or more responses to the party. The query may be received electronically over a communication network and the one or more responses are transmitted electronically to the party over the communication network.

In accordance with one or more further aspects of the present invention, the methods and apparatus for controlling cache memories described thus far and/or described later in this document, may be achieved utilizing suitable hardware, such as that shown in the drawings hereinbelow. Such hardware may be implemented utilizing any of the known technologies, such as standard digital circuitry, analog circuitry, any of the known processors that are operable to execute software and/or firmware programs, one or more programmable digital devices or systems, such as programmable read only memories (PROMs), programmable array logic devices (PALs), any combination of the above, etc. Further, the methods of the present invention may be embodied in a software program that may be stored on any of the known or hereinafter developed media.

Other aspects features and advantages of the present invention will become apparent to those of ordinary skill in the art when the description herein is taken in conjunction with the accompanying drawings.

BRIEF DESCRIPTION OF THE DRAWINGS

For the purposes of illustration, forms are shown in the drawings that are preferred, it being understood that the invention is not limited to precise arrangements or instrumentalities shown.

DETAILED DESCRIPTION OF THE PREFERRED EMBODIMENTS

The methods and apparatus of the present invention provide new and unique approaches to generating valuable information about the backup data in a computing environment. In accordance with one or more aspects of the present invention, a broad range of backup storage devices are transparently made available on the shared high-speed network by which their behavior and standard interfaces are transparently imitated. Thus, an apparatus employing one or more aspects of the present invention will be identified by commonly available third party backup software (like Veritas or Legato) as a standard backup storage device, and such third party backup software will send their backup data-stream to the apparatus as part of an existing backup process.

Upon receipt of the backup data-stream from the third party backup software, the apparatus will analyze data elements in the data-stream, collect valuable management information about those data elements, and store the management information in an easily accessible format for subsequent review and query by users and administrators of the original data. As part of the integral process, the apparatus may store the backup data-stream on any standard backup storage device, including the imitated backup storage device, before, during and/or after the analysis and storage of the management information. Thus, the traditional approaches to retrieving the elements of the backup data-stream may be used to subsequently restore the data with or without assistance from the apparatus.

Figure 1:
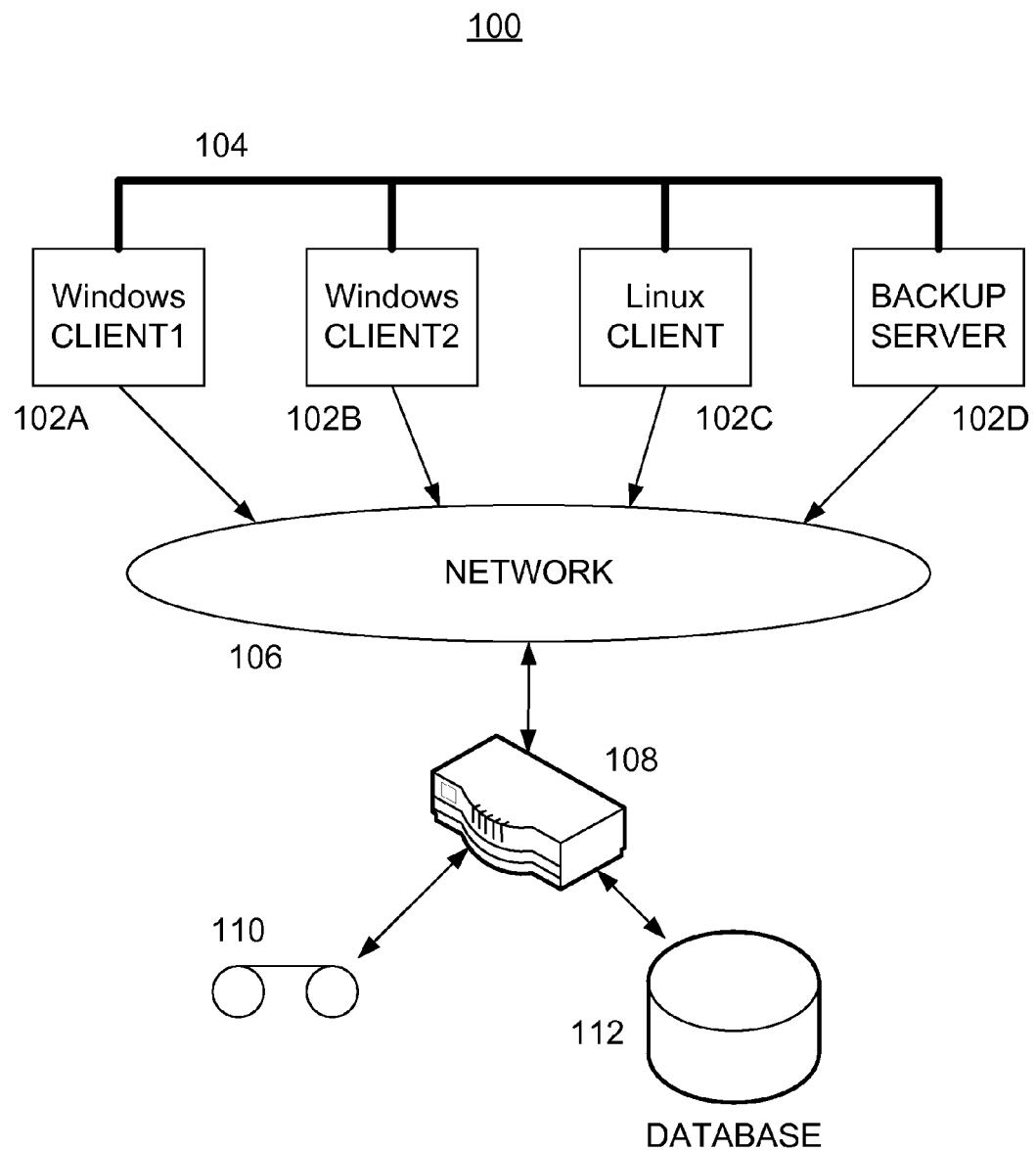
FIG. 1 is a block diagram of a system suitable for use in connection with carrying out data backup processes in accordance with one or more aspects of the present invention.

Reference is now made to FIG. 1, which is a block diagram of a system 100 suitable for use in connection with one or more aspects of the present invention. The system 100 includes a plurality of sources 102A, 102B, 102C, 102D, etc. (which may be referred to herein collectively as "sources 102"), a communication network 104, another communication network 106, a processor 108, a back-up storage device 110, and a database 112. The plurality of sources 102 possess data that may need to be archived. For example, the sources may include a Windows client, a Linux client, a UNIX client, or any other operating system client. The sources 102 may be computer servers, desktop computers, laptop computers, notebook computers, personal digital assistants, source databases, etc. The sources 102 may be coupled to one another over a local area network (LAN) or any other type of communication network. The sources 102 may be in communication with the network 106, which may be a SAN or any other type of network. At least one source in 102, a Backup Server, must run a backup program to coordinate the archiving of data. The Backup Server source may direct data from sources in 102 over the network 104 or 106 to the back-up storage device 110. The processor 108 is in communication with the network 106, the back-up storage device 110, and the database 112. It is noted that the processor 108 may be coupled to the network 106 through a server (not shown). It is noted that the back-up storage device 110 may be one or more traditional tape drives, disk subsystems, etc. that are known in the art or may be hereinafter developed.

In accordance with one or more general aspects of the present invention, the processor 108 is preferably operable to receive at least one data stream from one or more of the sources 102 that are intended for archiving on the back-up storage device 110, and to extract management data from the data stream for storage in the database 112. In addition, the processor 108 is preferably operable to archive the contents of the data stream on the back-up storage device 110. In this context, the processor 108 is positioned between the sources 102 and the back-up storage device 110, much like a traditional storage router. Although the processor 108 preferably is operable to carry out the functionality of a traditional storage router (which will be discussed in more detail below), the processor 108 is preferably capable of carrying out additional functionality, namely, management data extraction and indexing processes. As such, the processor 108 is ideally operable to exhibit the same protocols to transparently receive data streams from the various sources 102 as well as exhibiting the protocols for achieving the data streams in the back-up storage device 110.

In this sense, the processor 108 bridges the back-up storage device by passing shared network protocols on the front-end to other shared or non-shared protocols on the back-end. Thus, the processor 108 is transparent in that it presents itself as a shared version of the back-up data storage device 110 at least in terms of how it is viewed by the sources 102.

The processor 108 may also be operable to produce SRM-type data as would a traditional SRM product. By combining these features of storage routers, SRM data generation, and management information indexing, a new breed of appliance is achieved that adds significant value to the back-up process without requiring any new and distinct administrative overhead tasks. This advantageously takes a relatively low margin commodity to a product that adds significant value. Although any of the known or hereinafter developed technologies may be used to implement the processor 108, a modern Intel or AMD based computer with at least a Fibre-channel controller and a SCSI controller is suitable for such implementation.

The management data extracted from the data-stream preferably includes at least one of: (i) an identifier of a source of the data-stream; (ii) volume information concerning where the data of the data-stream were stored; (iii) metadata of the data of the data-stream; (iv) information concerning types of data files of the data-stream; and (v) keywords of the data files of the data-stream. The volume information may include: (i) a size of each volume of data, (ii) space consumed by each volume, and/or (iii) space available in each volume. The metadata may include: (i) one or more identifiers of one or more groups of users generating the data, (ii) one or more identifiers of one or more users generating the data, (iii) file and/or folder sizes of the data, and/or (iv) one or more identifiers of one or more authors generating the data.

As discussed above, the processor 108 preferably exhibits traditional storage router functionality, which is particularly useful in interfacing with the SAN 106. Indeed, the SAN 106 may be implemented using Fibre Channel technology or any other shared storage interconnect technology like iSCSI or Infini-band (which are also gaining acceptance). As most tape drives use SCSI technology as the preferred interface technology, many existing products that may be used to implement the backup storage device 100 cannot be easily shared by multiple computer systems. A storage router, however, allows a native SCSI device to be connected to fibre-channel in a transparent manner. These devices are called storage routers since they route storage commands from one protocol to another, such as is involved in converting shared interconnect technologies like fibre-channel, iSCSI, or Infini-band to another protocol like SCSI or IDE.

A brief description of the above-mentioned protocols will now be provided. Fibre Channel is a highly-reliable, one, two or multi gigabit interconnect technology that allows concurrent communications among workstations, mainframes, servers, data storage systems, and other peripherals using SCSI, IP and a wide range of other protocols to meet the needs of a given data center.

SCSI (Small Computer System Interface) is a set of ANSI (American National Standards Institute) standard electronic parallel interfaces that allow personal computers to communicate with peripheral hardware such as disk drives, tape drives, CD-ROM drives, printers, and scanners faster and more flexibly than previous interfaces. (SCSI is sometimes colloquially known as "scuzzy"). iSCSI is Internet SCSI, an Internet Protocol-based storage networking standard for linking data storage facilities, developed by the Internet Engineering Task Force (IETF). By carrying SCSI commands over IP networks, iSCSI is used to facilitate data transfers over intranets and to manage storage over long distances. The iSCSI protocol is a key technology expected to help bring about rapid development of the storage area network (SAN) market, by increasing the capabilities and performance of storage data transmission. Because of the ubiquity of IP networks, iSCSI can be used to transmit data over local area networks (LANs), wide area networks (WANs), or the Internet and can enable location-independent data storage and retrieval.

When an end user or application sends a request, the operating system generates the appropriate SCSI commands and data request, which then go through encapsulation and, if necessary, encryption procedures. A packet header is added before the resulting IP packets are transmitted over an Ethernet connection. When a packet is received, it is decrypted (if it was encrypted before transmission), and disassembled, separating the SCSI commands and request. The SCSI commands are sent on to the SCSI controller, and from there to the SCSI storage device. Because iSCSI is bi-directional, the protocol can also be used to return data in response to the original request.

Unlike FCIP, iSCSI can run over existing Ethernet networks. A number of vendors, including Cisco, IBM, and Nishan have introduced iSCSI-based switches and routers.

InfiniBand is an architecture and specification for data flow between processors and I/O devices that promises greater bandwidth and almost unlimited expandability in computer systems. InfiniBand is expected to gradually replace the existing Peripheral Component Interconnect (PCI) shared-bus approach used in most of today's personal computers and servers. Offering throughput of up to 2.5 gigabytes per second and support for up to 64,000 addressable devices, the architecture also promises increased reliability, better sharing of data between clustered processors, and built-in security. InfiniBand is the result of merging two competing designs, Future I/O, developed by Compaq, IBM, and Hewlett-Packard, with Next Generation I/O, developed by Intel, Microsoft, and Sun Microsystems.

IDE (Integrated Drive Electronics) is a standard electronic interface used between a computer motherboard's data paths or bus and the computer's disk storage devices. The IDE interface is based on the IBM PC Industry Standard Architecture (ISA) 16-bit bus standard, but it is also used in computers that use other bus standards. Most computers sold today use an enhanced version of IDE called Enhanced Integrated Drive Electronics (EIDE).

When a storage router is placed in front of a traditional SCSI tape drive, the tape drive is available on a shared network to many hosts. Note that some tape manufacturers are starting to embed a storage router within the tape unit, which makes the tape drive appear as if it can connect to the shared network natively.

Figure 2:
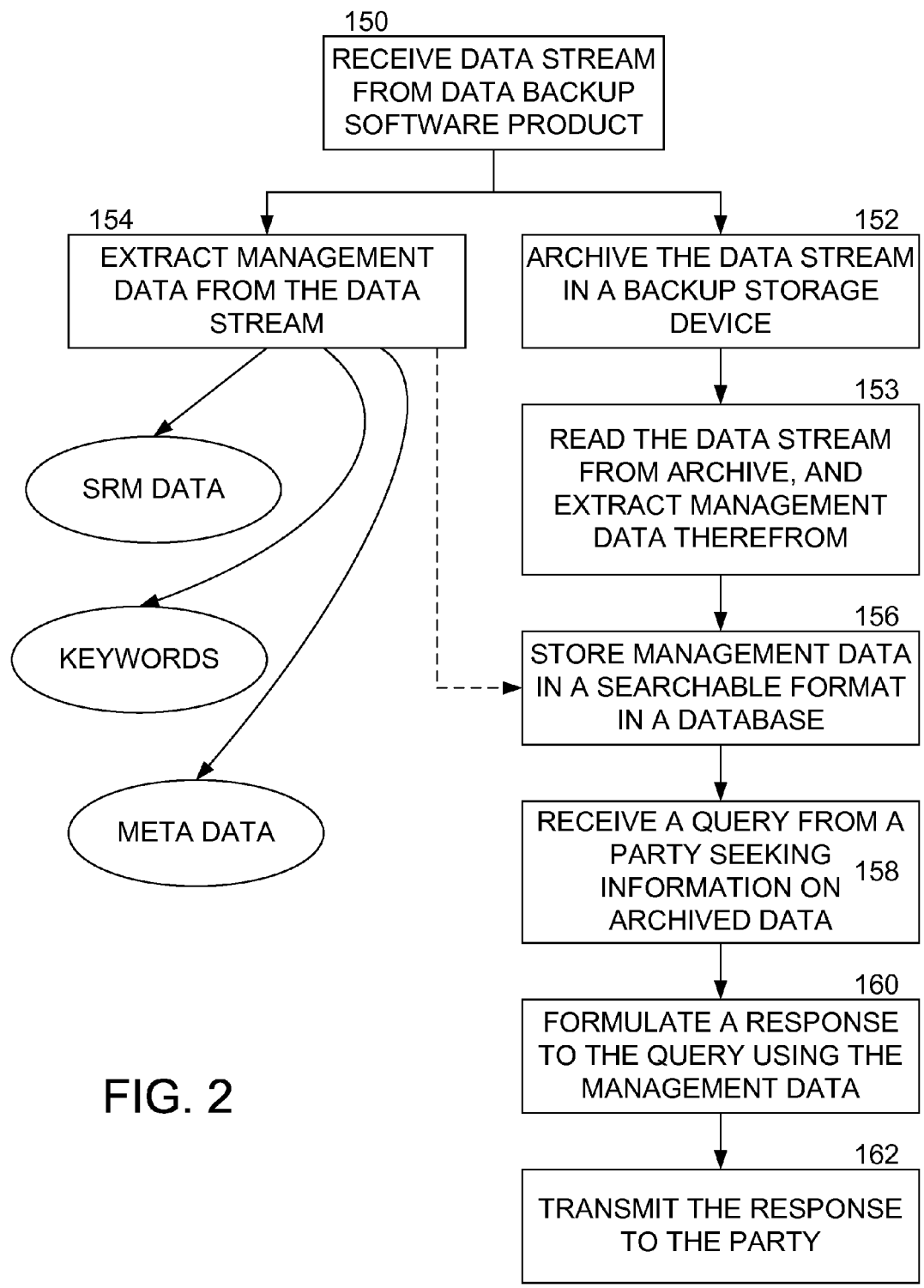
FIG. 2 is a flow diagram illustrating process steps that may be carried out by the system of FIG. 1 in accordance with one or more aspects of the present invention.

As mentioned above, the processor 108 preferably enjoys more functionality than traditional storage routing. Indeed, the processor 108 is preferably transparent to the source 102 producing the data-stream such that it is apparent to the source 102 that the data-stream is being delivered to the backup storage device 110. The functionality of the processor 108 will be discussed in more detail with reference to FIG. 2, which is a flow diagram illustrating process steps that may be carried out by, or in conjunction with, the processor 108. Thus, the processor and/or related hardware functions as a storage medium containing a software program, the program being capable of causing the processor to carry out certain actions that will be discussed herein, for example, with respect to FIG. 2. At action 150, the commercially available backup software running on a Backup Server source in 102 will send their backup data-stream to the processor 108, which in effect, bridges the archiving device 110. The processor 108 preferably passes a copy of the data-stream to the archiving device 110 (action 152) and also performs data analysis on the data-stream to extract the management data therefrom (action 154). The management data may include keywords from the data files, meta data, SRM data, and the like.

The protocol of a particular data-stream produced by a source 102 is typically a proprietary format of a vendor of data backup products. In order to imbue the processor 108 with the ability to analyze the data-stream and extract the management data, the proprietary formats of the protocols should be reverse engineered or otherwise determined. The reverse engineering of such protocols is well within the purview of a skilled artisan. Once the formats of the protocols are known, the reversal thereof may be accomplished by the processor 108 by way of software instructions. Thus, the extraction of the management data from the bit-stream may include separating distinct data sets from the data-stream. For example, the distinct data sets may include file folders, data files, and types of data files, etc.

As most data files also have a proprietary format, such as a Microsoft Word data file, a Microsoft Excel data file, an Adobe text or image data file, etc., knowledge of the format of such data files will also need to be obtained, such as by way of reverse engineering. Once the proprietary formats of the data file protocols are known, the reversal thereof may be accomplished by the processor 108, again by way of software instructions. Thus, the extraction of the management data from the bit-stream may further include segregating types of data within the data sets into data groups, such as text data, image data, audio data, graphic data, tabular data, hyperlink data, and executable data.

As the processor 108 is capable of reversing the data-stream and data file protocols, the management data may be readily extracted from the data-stream, such as extracting any of the following information: (i) an identifier of a source of the data-stream; (ii) volume information concerning where the data of the data-stream were stored (a size of each volume of data, space consumed by each volume, and/or space available in each volume); (iii) metadata of the data of the data-stream (one or more identifiers of one or more groups of users generating the data, one or more identifiers of one or more users generating the data, file and/or folder sizes of the data, and/or one or more identifiers of one or more authors generating the data); (iv) information concerning types of data files of the data-stream; and (v) keywords of the data files of the data-stream. This information will be collected for each source, volume, and file being backed up.

As discussed above, the processor 108 may store the backup data-stream on any standard backup storage device, including the bridged backup storage device, before, during and/or after the analysis and storage of the management information (action 156). For example, the processor 108 may first cause the data stream to be stored in the backup storage device 110 (action 152) and thereafter read the backup data out of the storage device 110 to facilitate extraction of the management data from the re-produced data stream (action 153). Alternatively, the processor 108 may facilitate the extraction of the management data from the data stream substantially simultaneously with the storage thereof in the backup storage device 110 (action 154). In this regard, the processor 108 may be operable to extract the management data substantially simultaneously with the receipt of the data stream from the source 102. Alternatively, the processor 108 may be operable to buffer the data stream in combination with the extraction and archiving processes (also action 154). As an alternative embodiment, the processor 108 may be operable to perform the extraction process before the data are archived, such as through the use of a buffering capability (also action 154).

It is noted that, while the structure of the system 100 is preferred, the inventive features of the present invention may be applied to alternative system configurations without departing from the spirit and scope of the invention. Indeed, the number and nature of the possible configurations are substantial as will be apparent to the skilled artisan. For example, the functionality of the processor 108 discussed hereinabove may be fully or partially implemented in a server (not shown) that interfaces with the network 106 as opposed to being implemented in combination with a router function. This may require substantial CPU power and sophistication because the required processing load may be very high to carry out both server functions and data extraction functions.

Figure 3:
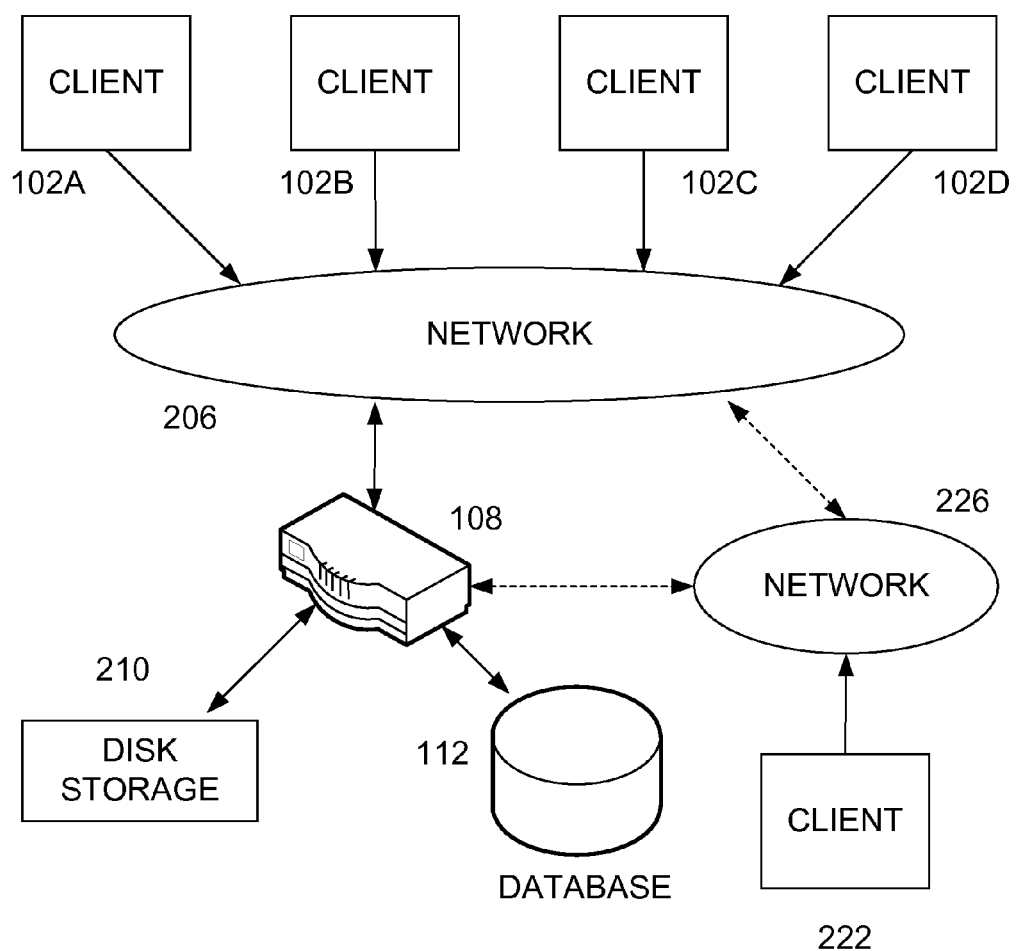
FIG. 3 is a block diagram of an alternative system suitable for use in connection with carrying out data backup processes in accordance with one or more aspects of the present invention.

FIG. 3 illustrates an alternative system 200 that shares some obvious similarities with the system 100 of FIG. 1. The system 200 of FIG. 3, however, contemplates that the network 206 may be the Internet and the clients 202 may direct their data stream(s) to the processor 108 over the Internet 206. This permits backups to be conducted over the Internet, either to a remote site, or to a service bureau. Among the differences of this arrangement as compared with that of FIG. 1 is that instead of implementing a SAN/Fibre Channel network in front of the backup device, the processor 108 is located on an Internet/IP network, e.g., just in front of the firewall. The network protocol used should not have a significant impact on performance.

In a further alternative, the network 206 may be a SAN or other local network that is in communication with another network 226, such as the Internet. The other network 226 may be used as a channel over which to transmit data streams from one or more clients 222. Still further, the network 226 may channel data streams to the processor 108 without passing through the network 206.

The data being collected by the processor 108 has many unique attributes that may overtax the capabilities of general-purpose databases. Indeed, generic database systems are designed for constant updates and therefore do not optimize the size and layout. Some aspects associated with the database 112 include: (i) that the data is being produced in a continuous uninterrupted stream; (ii) that once the database has been completely written the data is read-only; (iii) that the data-stream is a representation of another database (a file system) so knowledge of this file system can be taken advantage of; (iv) that the system has very stringent performance requirements; ideally the throughput to the archive device should be the same whether or not the processor 108 is being used; and (v) that the database 112 needs to scale with the addition of more disks and controllers.

Because of these issues, it may be preferable to deploy a custom database of more optimal performance and size in order to meet some or all of the aspects listed above. The database 112 is a preferably a proprietary database stored on a standard RAID (redundant array of independent disks) subsystem. The use of a RAID subsystem provides a way of redundantly storing the data in different places on multiple hard disks. This improves performance and reliability.

The number of words in a language is a reasonable fixed upper bound. English, with the largest number of words of any language has an unabridged dictionary of around 150,000 words with another 20,000-30,000 technical and medical terms. If stems, names, places, historic words, are included we can still put a reasonable upper limit of 1,000,000 words. Assuming the average word has 6-8 characters means we can store all strings for English in less than 10 MB. It is therefore trivial to store all unique words of a language in main memory. Placing an upper bound on the number of words to index implies that data structures used to represent these words can also have a reasonable upper bound and need not be infinitely extensible. Since it is possible to create a pathological case to unravel any fixed data structure, the system 100 may have the ability to terminate a database and start a new supplemental database at any point in time. The query engine may be designed to understand that multiple physical databases may represent a single logical instance.

It is preferred that the query capabilities of the database 112 are similar to an Internet Search Engine like Google, for example: (i) it should be very fast; (ii) it should offer the AND and OR operator; (iii) the default text search should be an AND operation; (iv) it should have no word stems; (v) it should have no wild cards for text searches; (vi) it should have an "exact match" capability; (vii) it should have a NOT or "−" operator to exclude words; and (viii) common words (stop/filler words) should not be indexed.

In addition, the database 112 preferably offers a NEAR(x) operator which may empower the user to refine searches using their knowledge. For example, "text1" NEAR(x) "text2" finds occurrences of the string "text1" within x words of "text2".

The database 112 is preferably structured so that an API can be exported which will allow an application to read the indexed contents of a file for further analysis later. This allows additional knowledge based applications to analyze the "essence" of the document (the "essence" is an ordered list of the "important" words that were indexed).

Query performance is an important feature of the search engine. That is, users of this system should get answers to any reasonable query (action 158) within a second or two. This speed should allow users to, without hesitation, continuously refine their queries and get better results.

The database 112 is a definitive index of what was stored on the archiving device 110 and it provides a good approximation of what exists on disk. The answers to queries (action 160) are based on what is believed that the disk looked like when a backup was taken. The matching files returned from a query represent the source of the data. The user can then use any file transfer mechanism (http, ftp) to get the contents of the original file under the original OS's security constraints. The query engine preferably returns an URL for the ftp and http protocols for that file. The response formulated in connection with the answers to the queries may be transmitted to the party requesting same (action 162).

Of interest is how to represent word tokens within the database 112. It has been determined that a hash structure would probably work best. Hashes are fast and can consume small amounts of memory compared to trie-based algorithms. Although hash restricts the query capability to exact text matches as opposed to stems or wildcard searches, these types of searches are not required. It is noted that although a hash is preferred, a trie-based algorithm may be employed without departing from the spirit and scope of the invention.

An important feature of any hash based data structure is the distribution of the hash function. Although any of the known hashing functions may be employed, it preferred that a publicly available hashing function developed by Bob Jenkins is utilized in connection with various aspects of the present invention. Mr. Jenkins's hash functions have been measured at a rate of over 200 MB/sec on a 2.4 GHz Pentium IV. A commented version of Mr. Jenkins's hashing algorithm obtained from his website (http://burtleburtle.net/bob/hash/doobs.html) is illustrated below:

```
typedef unsigned long int ub4;  /* unsigned 4-byte quantities */
typedef unsigned char ub1;  /* unsigned 1-byte quantities */
#define hashsize(n) ((ub4)1<<(n))
#define hashmask(n) (hashsize(n)-1)
/*
--------------------------------------------------------------------
mix -- mix 3 32-bit values reversibly.
For every delta with one or two bits set, and the deltas of all three
high bits or all three low bits, whether the original value of a,b,c
is almost all zero or is uniformly distributed,
        If mix( ) is run forward or backward, at least 32 bits in a,b,c
have at least ¼ probability of changing.
        If mix( ) is run forward, every bit of c will change
between ⅓ and ⅔ of the time. (Well, 22/100 and 78/100 for
some 2-bit deltas.)
mix( ) was built out of 36 single-cycle latency instructions in a
structure that could supported 2x parallelism, like so:
a -= b;
a -= c; x = (c>>13);
b -= c; a ^= x;
b -= a; x = (a<<8);
c -= a; b ^= x;
c -= b; x = (b>>13);
...
--------------------------------------------------------------------
*/
#define mix(a,b,c) \
{ \
a -= b; a -= c; a ^= (c>>13); \
b -= c; b -= a; b ^= (a<<8); \
c -= a; c -= b; c ^= (b>>13); \
```

-continued

```
a -= b; a -= c; a ^= (c>>12); \
b -= c; b -= a; b ^= (a<<16); \
c -= a; c -= b; c ^= (b>>5); \
a -= b; a -= c; a ^= (c>>3); \
b -= c; b -= a; b ^= (a<<10); \
c -= a; c -= b; c ^= (b>>15); \
}
/*
--------------------------------------------------------------------
hash( ) -- hash a variable-length key into a 32-bit value
k    : the key (the unaligned variable-length array of bytes)
len  : the length of the key, counting by bytes
initval : can be any 4-byte value
Returns a 32-bit value. Every bit of the key affects every bit of
the return value. Every 1-bit and 2-bit delta achieves avalanche.
About 6*len+35 instructions.
The best hash table sizes are powers of 2. There is no need to do
mod a prime (mod is sooo slow!). If you need less than 32 bits,
use a bitmask. For example, if you need only 10 bits, do
h = (h & hashmask(10));
In which case, the hash table should have hashsize(10) elements.
If you are hashing n strings (ub1 **)k, do it like this:
for (i=0, h=0; i<n; ++i) h = hash( k[i], len[i], h);
--------------------------------------------------------------------
*/
ub4 hash( k, length, initval)
register ub1 *k;       /* the key */
register ub4 length;   /* the length of the key */
register ub4 initval;  /* the previous hash, or an arbitrary value */
{
register ub4 a,b,c,len;
/* Set up the internal state */
len = length;
a = b = 0x9e3779b9;  /* the golden ratio; an arbitrary value */
c = initval;         /* the previous hash value */
/*--------------------------------------- handle most of the key */
while (len >= 12)
{
a += (k[0] +((ub4)k[1]<<8) +((ub4)k[2]<<16) +((ub4)k[3]<<24));
b += (k[4] +((ub4)k[5]<<8) +((ub4)k[6]<<16) +((ub4)k[7]<<24));
c += (k[8] +((ub4)k[9]<<8) +((ub4)k[10]<<16)+((ub4)k[11]<<24));
mix(a,b,c);
k += 12; len -= 12;
}
/*------------------------------------ handle the last 11 bytes */
c += length;
switch(len)            /* all the case statements fall through */
{
case 11: c+=((ub4)k[10]<<24);
case 10: c+=((ub4)k[9]<<16);
case 9 : c+=((ub4)k[8]<<8);
/* the first byte of c is reserved for the length */
case 8 : b+=((ub4)k[7]<<24);
case 7 : b+=((ub4)k[6]<<16);
case 6 : b+=((ub4)k[5]<<8);
case 5 : b+=k[4];
case 4 : a+=((ub4)k[3]<<24);
case 3 : a+=((ub4)k[2]<<16);
case 2 : a+=((ub4)k[1]<<8);
case 1 : a+=k[0];
/* case 0: nothing left to add */
}
mix(a,b,c);
/*-------------------------------------- report the result */
return c;
}
```

The hash data structure will allow a simple index into a bucket with a linked list being used to manage collision. Since it is assumed that an upper bound exists on the number of words and a reasonable distribution from the hash function, a fixed sized hash bucket with fixed number of collision buckets may be created. Recall that if the structure fails to capture a pathological case one may terminate that instance of the database and start a new one.

Once a bucket is determined, a unique entry for that word is found or created. If all unique words within a data stream are represented in a flat file, then the offset of any word within the flat file is a unique identifier for that word. With this representation, any word within the data stream can be uniquely identified and located by the tuple <hash, wordid>, where wordid is the offset for where this word is stored. From a <hash, wordid> tuple it can be determined which files within the data stream represent this word and the offset for each occurrence of the word within a file.

A desirable feature of the database 112 is a list of all ordered word lists within a file, which can be read to perform additional knowledge operations.

Figure 4:
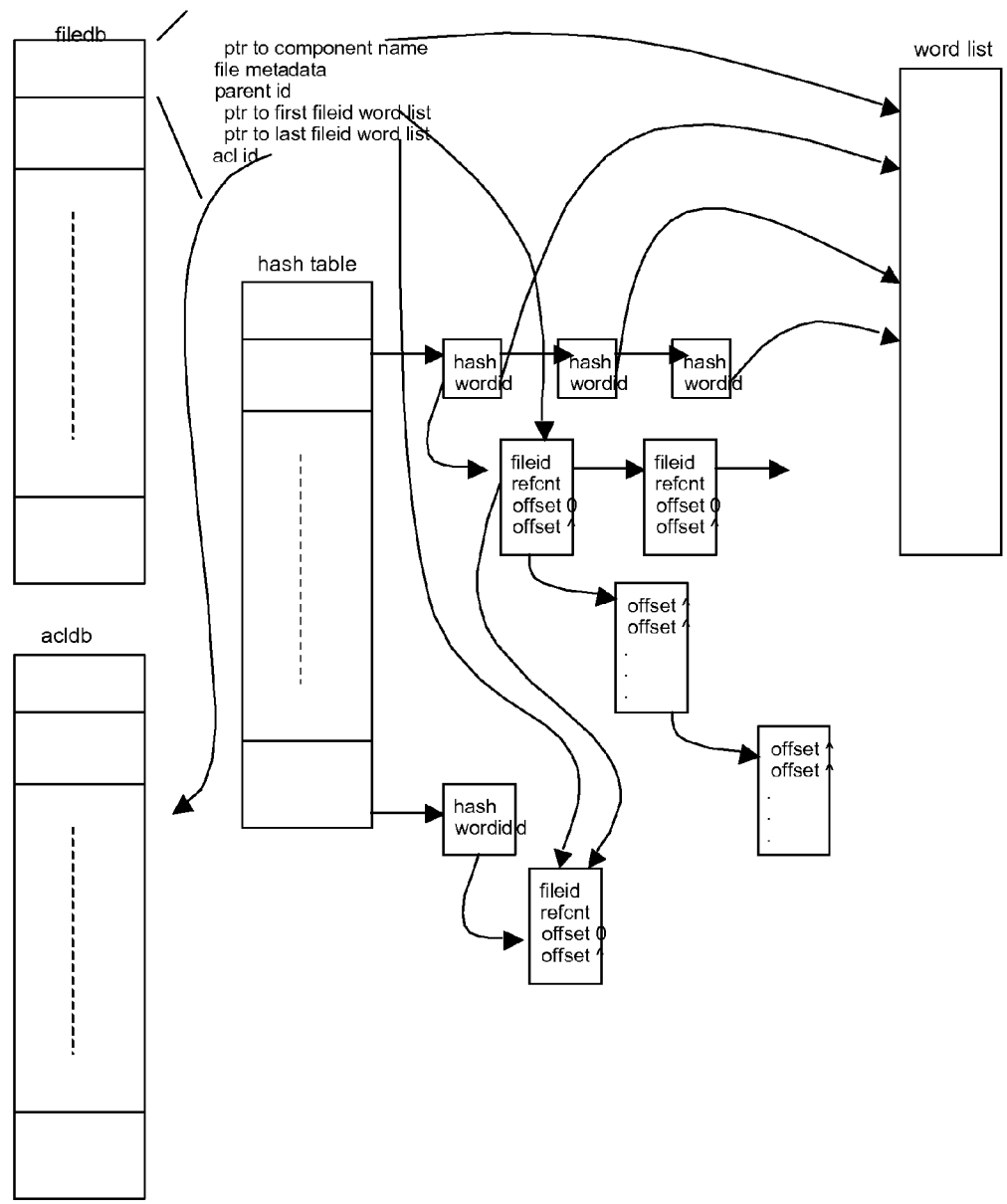
FIG. 4 is a block diagram of a database structure suitable for use in connection with implementing the database of FIG. 1 or 2.

The above features of the database 112 may be realized by the memory data structures shown in FIG. 4. It is noted that the on-disk representation of these memory structures will be different since the query engine will have different requirements especially for buffering. The data structure includes the following structures filedb, acldb, wordlist, and hash table.

filedb is an array of file entries, one entry per file. The index of this array represents a file id reference. A file entry contains all meta-data to describe a file in the system. A filedb stores its parent's id so that a full pathname can be calculated from any filedb entry. Filedb is also the head of a chain linking all words referenced by a specific file. This linkage is used to support the reading of the "essence" of a file as mentioned above. The filedb database is stored on disk in a separate file so that it can grow to the file size limits of the underlying Linux operating system which is $2^{44}$ bytes (1 Terabyte). The current estimate is for a filedb entry to be around 512 bytes. Therefore, $2^{35}$ million files can be stored in 1TB.

Acldb is a structure containing ACL entries for the system. This may be an array or a searchable structure. In either case, a filedb entry will have an identifier for each ACL structure. Acldb may be stored as a separate file on disk.

Wordlist is a concatenated list of utf-8 strings for all text and component names in the data stream. This data structure may be stored as a packed list of vchar's. A vchar or variable character set is defined as <Vint, "string"> where Vint is a variable sized int. This type of structure allows comparison optimizations where the length of the word can be compared before the actual characters. The offset of a word in this list is used as an id to identify unique words. Words that are indexed appear only once in this list. Word list is stored in a separate file on disk.

Hash table is a fixed length hash table of pointers to <hash, wordid, cnt, fileid offset> tuples. Based on memory usage and the size of the dataset to hash, one or two million entries may be supported with as many as 8 entries per bucket. On disk, each entry on a bucket occupies 16 bytes for storing a hash value, wordid, the number of files referencing this word, and a pointer to the list of files referencing this word. Hash is a 32-bit quantity representing a Jenkins hash of the string. Wordid is a 32-bit field representing the relative offset into the wordlist table for a string. This data structure support a very compact mechanism for doing the initial search for any query. That is, a hash value is calculated for the input string, the block containing the hash is calculated and read, the buckets are then scanned for the matching hash and wordid. Each matching hashing entry is compared to the source string to confirm a match.

Each <hash, wordid, cnt, fileid offset> structure points to a linked list of all files that reference this word. The keys for this structure is the <fileid, cnt, location offset> tuple that is used for each query. The remaining structure maintains a linked list of location chunks. A location chunk represents the relative location of each word within the file. Location chunks are of a form <starting location, delta location, delta location . . . >, where delta location is a Vint structure. A variable integer is used to conserve space since the occurrence of identical words will be relatively close to each other. This structure also has a pointer to a linked list of similar structures for each fileid. This relationship supports the "essence" operation that was mentioned earlier.

Many of the data structures in FIG. 4 can consume large amounts of memory depending on the input stream. Particular pathological cases may cause one structure to grow exponentially compared to others. Hereinbelow, a discussion is presented as to the growth patterns and rate for each data structure, how it is managed, and the pathological cases that can cause exponential growth.

Filedb adds a new entry for each new file. Once a file is processed the file entry is no longer needed so filedb may be operatively structured to stream its contents to disk when it reaches a size that is optimum for high-speed writing of the disk device. The size to start streaming may be tunable, but a value on the order of 1-2 MB is suitable depending on the number of disks being used. A pathological case would be a data stream containing more than 3.5 billion files. Such a case would exceed the maximum 44-bit file size in Linux for filedb. Under such a circumstance the database will terminate and a new database started if filedb exceeds max file size.

Hashdb uses a new hash entry for each unique word in the system. The entire hashdb structure is mapped into memory. Hashdb has a size of 128 MB for an 8 million entry hash. The database will stop storing word entries if the hash is full.

The entire wordlist database may be needed for processing each new word so wordlist is preferably kept in memory at all times. Wordlist has a list of all unique words in the data stream and under normal circumstances should be quite small (on the order of 1 MB). The size of hashdb limits the number of possible words in the database and there is a maximum length of a word that is hashed (currently 50). The product of these two values puts a upper limit on the maximum size of the wordlist database.

The <fileid, cnt, location offset> data structure tracks two important data elements. For each unique word in the data stream a list of files referencing this word is kept. For each occurrence of a word, a list of the locations for that word is kept. Once a file is processed, there is no need for the <fileid, cnt, location offset> or locations data structure. That is, these structures may be dumped to disk once the file has been processed. Therefore, the only pathological case is a single file containing the same two character words that needed to be indexed. In such a case, the locations chunk list will record a location entry for each occurrence. Each location entry would occupy a single byte for the variable integer. A 2 GB file would contain ~$2^{29}$ words, which would make the locations list on the order of 512 MB.

As mentioned above, FIG. 4 represents the data structures for the index database as it is being created. Once created it should be saved to disk in a manner such that it can queried efficiently. The layout of the database is important in this regard as it impacts the speed of each query and the memory and disk usage of the system under load. The most common operation to be performed by the database will likely be to find all files associated with a word. Using this core operation, a query application will perform all the other filtering logic to satisfy the user's original request. For example, the query string "text1 text2 text3", means that the query application should find the common files referencing text1, text2, and text3. The only time the query application will need offset information from the database is when the user uses the NEAR(x) or "exact match" operation.

Figure 5:
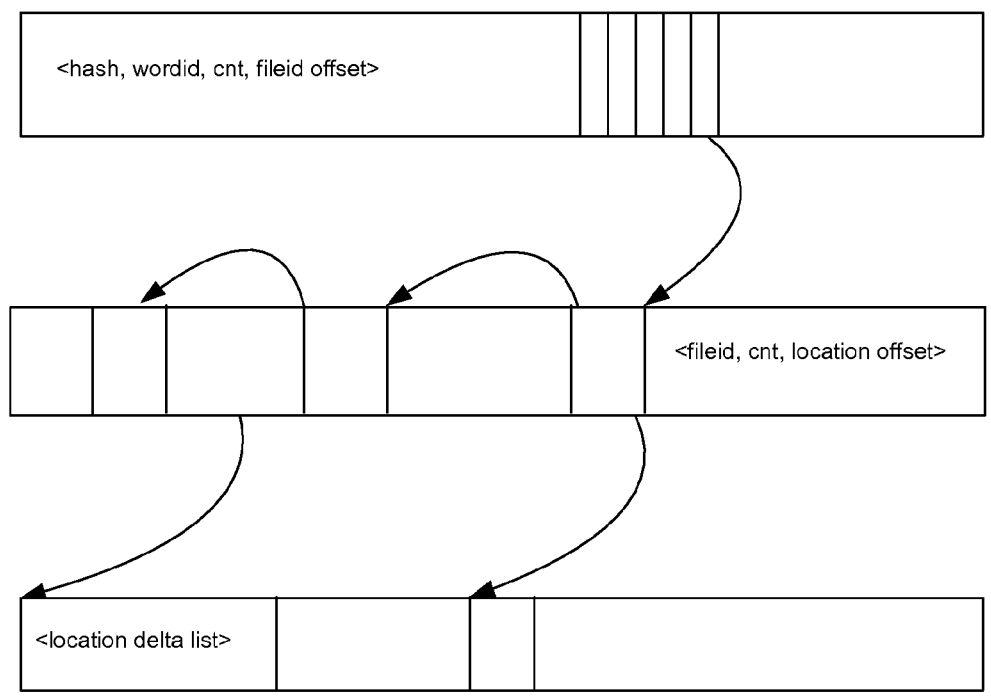
FIG. 5 is a block diagram of data structures suitable for use in connection with implementing the database of FIG. 4.

Reference is now made to FIG. 5, which is a block diagram illustrating a layout of the data structures of the database 112 in order to improve the ability of the database 112 to find files associated with a word. As mentioned above, the hash structure is statically allocated on disk and indexed into a bucket of 8 <hash, wordid, cnt, fileid offset> entries per hash value. This file is mapped from the query application.

Once a <hash, wordid, cnt, fileid offset> structure is found, the fileid offset points to the correct first entry of <fileid, refcnt, location offset> entries referring to this word. This file will also be mapped by the query application.

The query application preferably uses the above two data structures to answer most queries. The structures have been designed to be mappable so that the query application can remove all buffering requirements and depend on the LRU algorithms in the native operating system to manage data pages.

Each <fileid, refcnt, location offset> entry points to a packed array of locations. All locations are written and read sequentially to optimize query performance. In the specific example discussed thus far, the location database is only accessed if the query in question uses an "exact match" or the NEAR(x) operator. The location database is mapped by the query application.

A stop word is a common word that is not indexed for later querying. The stop word database is a collection of all such words. For each word that could be potentially indexed, the stop word database needs to be consulted first. If the word is in the stop word database, then the process stops and the word is not indexed. If the word is not in the database, then the word is indexed. The stop word database is integrated into the same hash structure as accepted words and are identified by a flag. The stop word database and its word list is stored as part of the main database so that the query application can reject or ignore user requests for words that are in the stop word database. It is noted that the stop word database is constructed once and need not be rebuilt unless the definition of the stop word list changes.

The database is preferably organized such that storage administrators or privileged users will be able to efficiently query the information stored in the database to find documents containing keywords or answer storage management questions. The following are examples of the types of queries that a user may ask.

Find all documents referencing a specific keyword?
List all spreadsheets referencing a specific project name?
Find all word documents written by a specific author?
Find the oldest Word document written by a specific author?
Find all files in a specific size range containing a specific keyword?

Once an indexed database has been collected, a user is preferably capable of querying the database server through the Web to answer questions as mentioned above. It is noted that the database server may be the processor 108, as it may only be active when a backup is being done. Otherwise, since the databases are read-only, multiple database servers may be employed to access the database through a shared storage subsystem. It is noted that no distributed locking issues are present because all completed database are read-only. It is preferred that databases that are not complete (i.e., that are being backed up) are not available for use and are identified as such.

The data stored in the database is preferably presented to the user using two methods. First, a very simple free form web-like interface is provided which requests a string or meta-data to search on and returns a list of matching entries. The second, a more traditional SRM like interface, provides a set of canned reports on the state of volumes across the enterprise. The free form interface will also have several keywords so that users can identify file meta-data and hosts.

Users are preferably authenticated through a login mechanism that will communicate with their enterprise's NIS (Network Information System) or Active Directory mechanism. The processor 108 preferably also has the capability of storing a local password database for environments that prefer a locally controlled password. For example, the normal file system security rights for Windows and UNIX systems may be honored by the database servers. That is, the database server will not allow a user to search indexed or meta-data information that they do not have a right to view.

It is noted that the search/query engine aspects of the present invention are similar to web search engines like Google, although there are significant differences. Web search engines are designed for the public Internet, while the search/query engine aspects of the present invention are designed for a private enterprise. Web search engines will only find documents that have been explicitly "published" to some web site, while the search/query engine aspects of the present invention finds everything that is backed up, which includes pretty much everything on system disks etc. Web search engines have very crude security models where you can access the data if you can find it (because the data has been made public on the Internet). The search/query engine aspects of the present invention retain all the security of the enterprise and only permits the user to access those specific documents etc. for which they have permission. Finally, web search engines do not have the capability to process meta-data, and the other forms of data discussed above as does the present invention.

While Microsoft has search features in its operating system products that facilitate the search of some data and meta-data, they have to build indexes in real time while the user waits. In accordance with various aspects of the invention, however, indexing and data gathering is performed as part of the backup process.

Advantageously, the present invention provides value to the standard backup processes by transparently creating detailed information concerning the backup data as a transparent part of the backup process. This eliminates the need, cost and overhead of an administrative process (distinct from the backup process itself) to create such information. Thus, the aspects of the instant inventive methods are simpler in construction, more universally usable and more versatile in operation than known methods or processes.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising:
    receiving at least one data-stream intended for archiving on a backup storage device;
    extracting management data from the data-stream, the management data including: (i) an identifier of a source of the data-stream; (ii) volume information concerning where the data of the data-stream were stored, including at least one of: a size of each volume of data, space consumed by each volume, and space available in each volume; (iii) metadata of the data of the data-stream, including at least one of: one or more identifiers of one or more groups of users generating the data, one or more identifiers of one or more users having access to the data, file size of the data, folder size of the data, and one or more identifiers of one or more authors generating the data; (iv) information concerning types of data files of the data-stream; and (v) keywords of the data files of the data-stream; and
    storing the management data in a searchable format in a database,
    wherein the method is carried out by a device that is transparent to a source producing the data-stream such that it is apparent to the source that the data-stream is being delivered to a backup storage device.

2. The method of claim 1, further comprising one of: (i) passing the data-stream to the backup storage device before the extraction step; (ii) passing the data-stream to the backup storage device substantially simultaneously with the extraction step; and (iii) passing the data-stream to the backup storage device after the extraction step.

3. The method of claim 2, further comprising:
    reading back data from the backup storage device after the data-stream has been passed to the backup storage device to re-create the data-stream; and
    performing the extraction step on the re-created data-stream.

4. The method of claim 1, wherein the source is taken from the group consisting of a computer server, a desktop computer, a laptop computer, a notebook computer, a personal digital assistant, and a source database, when the management data includes the identifier of the source of the data-stream.

5. The method of claim 1, wherein the volume is taken from the group consisting of computer disk drives and computer sub-drives, when the management data includes the volume information.

6. The method of claim 1, wherein a plurality of data-streams adhere to the same or different protocols, the method further comprising converting the different protocols to a protocol supported by the backup storage device.

7. The method of claim 1, wherein the extraction step includes at least one of:
    (i) separating distinct data sets from the data-stream; and
    (ii) segregating types of data within the data sets into data groups.

8. The method of claim 7, wherein:
    the distinct data sets include at least one of file folders, data files, and types of data files; and
    the types of data include at least one of: text data, image data, audio data, graphic data, tabular data, hyperlink data, and executable data.

9. The method of claim 8, further comprising indexing at least one of the types of data to obtain keywords thereof.

10. The method of claim 7, further comprising using a predetermined rule set to recognize the distinct data sets of the data-stream.

11. The method of claim 10, wherein the predetermined rule set is based on a data-stream protocol of a third party backup data product intended to be used to store the data-stream on the backup storage device.

12. The method of claim 10, wherein the predetermined rule set is taken from a group of pre-determined rule sets, each set based on a data-stream protocol of a third party backup data product.

13. A method, comprising:
    receiving at least one data-stream intended for archiving on a backup storage device;

extracting management data from the data-stream, the management data being descriptive of the data of the data-stream;

storing the management data in a searchable format in a database;

receiving at least one query from a party concerning the archived data-stream;

formulating one or more responses to the query based on an analysis of the management data stored in the database; and providing the one or more responses to the party, wherein the method is carried out by a device that is transparent to a source producing the data-stream such that it is apparent to the source that the data-stream is being delivered to a backup storage device.

14. The method of claim 13, wherein the query is received electronically over a communication network and the one or more responses are transmitted electronically to the party over the communication network.

15. The method of claim 14, wherein the communication network is the Internet.

16. A processor operable to execute a software program, the software program causing the processor to perform steps, comprising:

receiving at least one data-stream intended for archiving on a backup storage device;

extracting management data from the data-stream, the management data including: (i) an identifier of a source of the data-stream; (ii) volume information concerning where the data of the data-stream were stored, including at least one of: a size of each volume of data, space consumed by each volume, and space available in each volume; (iii) metadata of the data of the data-stream, including at least one of: one or more identifiers of one or more groups of users generating the data, one or more identifiers of one or more users having access to the data, file size of the data, folder size of the data, and one or more identifiers of one or more authors generating the data; (iv) information concerning types of data files of the data-stream; and (v) keywords of the data files of the data-stream; and storing the management data in a searchable format in a database wherein the steps carried out by the processor are such that they are transparent to a source producing the data-stream such that it is apparent to the source that the data-stream is being delivered to a backup storage device.

17. The processor of claim 16, further comprising one of: (i) passing the data-stream to the backup storage device before the extraction step; (ii) passing the data-stream to the backup storage device substantially simultaneously with the extraction step; and (iii) passing the data-stream to the backup storage device after the extraction step.

18. The processor of claim 17, further comprising:

reading back data from the backup storage device after the data-stream has been passed to the backup storage device to re-create the data-stream; and performing the extraction step on the re-created data-stream.

19. The processor of claim 16, wherein the source is taken from the group consisting of a computer server, a desktop computer, a laptop computer, a notebook computer, a personal digital assistant, and a source database, when the management data includes the identifier of the source of the data-stream.

20. The processor of claim 16, wherein the volume is taken from the group consisting of computer disk drives and computer sub-drives, when the management data includes the volume information.

21. The processor of claim 16, wherein a plurality of data-streams adhere to the same or different protocols, the steps further include converting the different protocols to a protocol supported by the backup storage device.

22. The processor of claim 16, wherein the extraction step includes at least one of: (i) separating distinct data sets from the data-stream; and (ii) segregating types of data within the data sets into data groups.

23. The processor of claim 22, wherein:

the distinct data sets include at least one of file folders, data files, and types of data files; and the types of data include at least one of: text data, image data, audio data, graphic data, tabular data, hyperlink data, and executable data.

24. The processor of claim 23, further comprising indexing at least one of the types of data to obtain keywords thereof.

25. The processor of claim 22, further comprising using a predetermined rule set to recognize the distinct data sets of the data-stream.

26. The processor of claim 25, wherein the predetermined rule set is based on a data-stream protocol of a third party backup data product intended to be used to store the data-stream on the backup storage device.

27. The processor of claim 25, wherein the predetermined rule set is taken from a group of pre-determined rule sets, each set based on a data-stream protocol of a third party backup data product.

28. The processor of claim 16, further comprising:

receiving at least one query from a party concerning the archived data-stream;

formulating one or more responses to the query based on an analysis of the management data stored in the database; and providing the one or more responses to the party.

29. The processor of claim 28, wherein the query is received electronically over a communication network and the one or more responses are transmitted electronically to the party over the communication network.

30. The processor of claim 29, wherein the communication network is the Internet.

31. An apparatus, comprising:

means for receiving at least one data-stream intended for archiving on a backup storage device;

means for extracting management data from the data-stream, the management data including: (i) an identifier of a source of the data-stream; (ii) volume information concerning where the data of the data-stream were stored, including at least one of: a size of each volume of data, space consumed by each volume, and space available in each volume; (iii) metadata of the data of the data-stream, including at least one of: one or more identifiers of one or more groups of users generating the data, one or more identifiers of one or more users having access to the data, file size of the data, folder size of the data, and one or more identifiers of one or more authors generating the data; (iv) information concerning types of data files of the data-stream; and (v) keywords of the data files of the data-stream; and means for storing the management data in a searchable format in a database wherein the receiving, extracting, and storing actions are carried out such that they are transparent to a source producing the data-stream such that it is apparent to the source that the data-stream is being delivered to a backup storage device.

32. A storage medium containing a software program, the program being capable of causing a processor to carry out actions, comprising:
receiving at least one data-stream intended for archiving on a backup storage device;
extracting management data from the data-stream, the management data including: (i) an identifier of a source of the data-stream; (ii) volume information concerning where the data of the data-stream were stored, including at least one of: a size of each volume of data, space consumed by each volume, and space available in each volume; (iii) metadata of the data of the data-stream, including at least one of: one or more identifiers of one or more groups of users generating the data, one or more identifiers of one or more users having access to the data, file size of the data, folder size of the data, and one or more identifiers of one or more authors generating the data; (iv) information concerning types of data files of the data-stream; and (v) keywords of the data files of the data-stream; and
storing the management data in a searchable format in a database
wherein the steps carried out by the processor such that they are transparent to a source producing the data-stream such that it is apparent to the source that the data-stream is being delivered to a backup storage device.

33. The storage medium of claim 32, further comprising one of: (i) passing the data-stream to the backup storage device before the extraction step; (ii) passing the data-stream to the backup storage device substantially simultaneously with the extraction step; and (iii) passing the data-stream to the backup storage device after the extraction step.

34. The storage medium of claim 33, further comprising:
reading back data from the backup storage device after the data-stream has been passed to the backup storage device to re-create the data-stream; and
performing the extraction step on the re-created data-stream.

35. The storage medium of claim 32, wherein the source is taken from the group consisting of a computer server, a desktop computer, a laptop computer, a notebook computer, a personal digital assistant, and a source database, when the management data includes the identifier of the source of the data-stream.

36. The storage medium of claim 32, wherein the volume is taken from the group consisting of computer disk drives and computer sub-drives, when the management data includes the volume information.

37. The storage medium of claim 32, wherein a plurality of data-streams adhere to the same or different protocols, the actions include converting the different protocols to a protocol supported by the backup storage device.

38. The storage medium of claim 32, wherein the extraction step includes at least one of: (i) separating distinct data sets from the data-stream; and (ii) segregating types of data within the data sets into data groups.

39. The storage medium of claim 38, wherein:
the distinct data sets include at least one of file folders, data files, and types of data files; and
the types of data include at least one of: text data, image data, audio data, graphic data, tabular data, hyperlink data, and executable data.

40. The storage medium of claim 39, further comprising indexing at least one of the types of data to obtain keywords thereof.

41. The storage medium of claim 38, further comprising using a predetermined rule set to recognize the distinct data sets of the data-stream.

42. The storage medium of claim 41, wherein the predetermined rule set is based on a data-stream protocol of a third party backup data product intended to be used to store the data-stream on the backup storage device.

43. The storage medium of claim 41, wherein the predetermined rule set is taken from a group of pre-determined rule sets, each set based on a data-stream protocol of a third party backup data product.

44. The storage medium of claim 32, further comprising:
receiving at least one query from a party concerning the archived data-stream;
formulating one or more responses to the query based on an analysis of the management data stored in the database; and
providing the one or more responses to the party.

45. The storage medium of claim 44, wherein the query is received electronically over a communication network and the one or more responses are transmitted electronically to the party over the communication network.

46. The storage medium of claim 45, wherein the communication network is the Internet.

47. An apparatus, comprising:
means for receiving at least one data-stream from one or more sources, the data-stream intended for archiving on a backup storage device;
means for carrying out a storage router function as between the sources and the backup storage device;
means for extracting management data from the data-stream, the management data including: (i) an identifier of a source of the data-stream; (ii) volume information concerning where the data of the data-stream were stored, including at least one of: a size of each volume of data, space consumed by each volume, and space available in each volume; (iii) metadata of the data of the data-stream, including at least one of: one or more identifiers of one or more groups of users generating the data, one or more identifiers of one or more users having access to the data, file size of the data, folder size of the data, and one or more identifiers of one or more authors generating the data; (iv) information concerning types of data files of the data-stream; and (v) keywords of the data files of the data-stream; and
means for storing the management data in a searchable format in a database
wherein the actions of receiving, extracting, and storing are carried out such that they are transparent to a source producing the data-stream such that it is apparent to the source that the data-stream is being delivered to a backup storage device.

48. An apparatus, comprising:
means for receiving at least one data-stream from one or more sources, the data-stream intended for archiving on a backup storage device;
means for carrying out a server function as between the sources and the backup storage device;
means for extracting management data from the data-stream, the management data including: (i) an identifier of a source of the data-stream; (ii) volume information concerning where the data of the data-stream were stored, including at least one of: a size of each volume of data, space consumed by each volume, and space available in each volume; (iii) metadata of the data of the data-stream, including at least one of: one or more identifiers of one or more groups of users generating the data, one or more identifiers of one or more users having access to the data, file size of the data, folder size of the data, and one or more identifiers of one or more authors generating the data; (iv) information concerning types of data files of the data-stream; and (v) keywords of the data files of the data-stream; and means for storing the management data in a searchable format in a database, wherein the actions of receiving, extracting, and storing are carried out such that they are transparent to a source producing the data-stream such that it is apparent to the source that the data-stream is being delivered to a backup storage device.

49. A method, comprising:

receiving at least one data-stream intended for archiving on a backup storage device;

storing the data-stream to the backup storage device;

after the data-stream has been stored on the backup storage device, reading the data stream out of the backup storage device and extracting management data from the data-stream, the management data including: (i) an identifier of a source of the data-stream; (ii) volume information concerning where the data of the data-stream were stored, including at least one of: a size of each volume of data, space consumed by each volume, and space available in each volume; (iii) metadata of the data of the data-stream, including at least one of: one or more identifiers of one or more groups of users generating the data, one or more identifiers of one or more users having access to the data, file size of the data, folder size of the data, and one or more identifiers of one or more authors generating the data; (iv) information concerning types of data files of the data-stream; and (v) keywords of the data files of the data-stream; and storing the management data in a searchable format in a database, wherein the receiving, storing the data-stream, reading the data stream, extracting, and storing the management data is carried out by a device that is transparent to a source producing the data-stream such that it is apparent to the source that the data-stream is being delivered to a backup storage device.

* * * * *